(12) United States Patent
Chang et al.

(10) Patent No.: US 11,228,028 B2
(45) Date of Patent: Jan. 18, 2022

(54) CATHODE OF LITHIUM ION BATTERY

(71) Applicant: INDUSTRIAL TECHNOLOGY RESEARCH INSTITUTE, Hsinchu (TW)

(72) Inventors: Chia-Ming Chang, Hsinchu (TW); Shih-Chieh Liao, Taoyuan (TW); Dar-Jen Liu, Taoyuan (TW); Wen-Bing Chu, Hsinchu (TW); Jin-Ming Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 339 days.

(21) Appl. No.: 16/231,757

(22) Filed: Dec. 24, 2018

(65) Prior Publication Data

US 2019/0198867 A1    Jun. 27, 2019

Related U.S. Application Data

(63) Continuation-in-part of application No. 15/941,841, filed on Mar. 30, 2018, now abandoned.

(51) Int. Cl.
*H01M 4/38* (2006.01)
*H01M 4/62* (2006.01)
(Continued)

(52) U.S. Cl.
CPC .......... *H01M 4/382* (2013.01); *H01M 4/131* (2013.01); *H01M 4/136* (2013.01); *H01M 4/505* (2013.01);
(Continued)

(58) Field of Classification Search
None
See application file for complete search history.

(56) References Cited

U.S. PATENT DOCUMENTS 8,608,987 B2    12/2013  Chen et al.
9,343,745 B1     5/2016  Lin et al.
(Continued)

FOREIGN PATENT DOCUMENTS

CN    104300123 A      1/2015
CN    105098193    *  11/2015
(Continued)

OTHER PUBLICATIONS

Taiwanese Office Action and Search Report dated May 16, 2019, for corresponding Taiwanese Application No. 107145453.
(Continued)

*Primary Examiner* — Laura Weiner
(74) *Attorney, Agent, or Firm* — Birch, Stewart, Kolasch & Birch, LLP

(57) ABSTRACT

A cathode of a lithium ion battery is provided. The cathode of a lithium ion battery includes a collector material. A first electrode layer including a lithium manganese iron phosphate (LMFP) material is disposed on a surface of the collector material. A second electrode layer including an active material is disposed on the first electrode layer. The active material includes lithium nickel manganese cobalt oxide (NMC), lithium nickel cobalt aluminum oxide (NCA), lithium cobalt oxide (LCO), Li-rich cathode material, or a combination thereof.

15 Claims, 10 Drawing Sheets

(51) Int. Cl.
  *H01M 10/0569* (2010.01)
  *H01M 4/131* (2010.01)
  *H01M 10/0525* (2010.01)
  *H01M 4/136* (2010.01)
  *H01M 4/525* (2010.01)
  *H01M 4/58* (2010.01)
  *H01M 4/505* (2010.01)
  *H01M 4/02* (2006.01)

(52) U.S. Cl.
  CPC ......... *H01M 4/525* (2013.01); *H01M 4/5825* (2013.01); *H01M 4/622* (2013.01); *H01M 4/623* (2013.01); *H01M 4/625* (2013.01); *H01M 4/626* (2013.01); *H01M 10/0525* (2013.01); *H01M 10/0569* (2013.01); *H01M 2004/028* (2013.01)

(56) References Cited

U.S. PATENT DOCUMENTS

| | | |
|---|---|---|
| 2006/0019151 A1 | 1/2006 | Imachi et al. |
| 2014/0113175 A1 | 4/2014 | Zhang |
| 2014/0272552 A1 | 9/2014 | Tanaka et al. |
| 2015/0010820 A1 | 1/2015 | Takami et al. |
| 2016/0049657 A1 | 2/2016 | Forbert |
| 2017/0092943 A1 | 3/2017 | Li et al. |
| 2017/0110723 A1 | 4/2017 | Ishibashi et al. |
| 2019/0267664 A1 | 8/2019 | Lin et al. |

FOREIGN PATENT DOCUMENTS

| | | | |
|---|---|---|---|
| CN | 105359307 A | | 2/2016 |
| CN | 105406069 A | | 3/2016 |
| CN | 105449265 A | | 3/2016 |
| CN | 105529458 A | | 4/2016 |
| CN | 103258999 B | | 8/2016 |
| CN | 105895857 A | | 8/2016 |
| CN | 106058245 A | | 10/2016 |
| CN | 106058265 A | | 10/2016 |
| CN | 106486639 | * | 3/2017 |
| CN | 106486639 A | | 3/2017 |
| CN | 107482166 A | | 12/2017 |
| CN | 109004170 A | | 12/2018 |
| EP | 3 147 971 A1 | | 3/2017 |
| JP | 2007-026676 | * | 2/2007 |
| JP | 2007-26676 A | | 2/2007 |
| JP | 2007-48744 A | | 2/2007 |
| JP | 2010-116302 A | | 5/2010 |
| JP | WO2014/034775 A1 | | 3/2014 |
| JP | 2014-157748 A | | 8/2014 |
| JP | 2014-179248 A | | 9/2014 |
| JP | 2015-46382 A | | 3/2015 |
| JP | 2015-519005 | * | 7/2015 |
| JP | 2015-519005 A | | 7/2015 |
| JP | 2015-527566 A | | 9/2015 |
| JP | 2016-76317 A | | 5/2016 |
| JP | 2017-63027 A | | 3/2017 |
| TW | I517477 B | | 1/2016 |
| WO | WO 2016/038682 A1 | | 3/2016 |

OTHER PUBLICATIONS

Extended European Search Report dated Dec. 12, 2019, for corresponding European Patent Application No. 19182117.2.

Japanese Office Action dated Jan. 7, 2020, for corresponding Japanese Patent Application No. 2018-242181, with English translation.

Japanese Office Action for Japanese Application No. 2018-242181, dated Aug. 25, 2020, with English translation.

Imachi et al., "Layered cathode for improving safety of Li-ion batteries," Journal of the Electrochemical Society, vol. 154, No. 5, 2007 (available electronically Mar. 13, 2007), pp. A412-A416.

Julien et al., "Olivine-Based Blended Compounds as Positive Electrodes for Lithium Batteries," Inorganics, vol. 4, No. 17, 2016, pp. 1-12.

Taiwanese Office Action and Search Report for Application No. 106145979, dated May 31, 2018.

Japanese Office Action for Japanese Application No. 2018-242181, dated Apr. 20, 2021, with English translation.

* cited by examiner

CATHODE OF LITHIUM ION BATTERY

CROSS REFERENCE TO RELATED APPLICATIONS

This application is a Continuation-In-Part of now-abandoned U.S. patent application Ser. No. 15/941,841, filed Mar. 30, 2018 and entitled "cathode of lithium ion battery", the entirety of which is incorporated by reference herein, which claims the benefit of Taiwan Application No. 106145979, filed on Dec. 27, 2017. The present application is also based on, and claims priority from, Taiwan Application Number 107145453, filed on Dec. 17, 2018, the entirety of which is incorporated by reference herein.

TECHNICAL FIELD

The disclosure relates to a cathode of a lithium ion battery.

BACKGROUND

Ternary material (NMC) has the advantages of low cost, high capacity, and good cycling performance, and has been widely used in many fields. However, batteries made from ternary material (NMC) have poor rate charge-discharge performance and poor safety.

Currently, a mixture of lithium iron manganese phosphate (LMFP) material and ternary material has been used to manufacture electrodes to improve the rate charge-discharge performance and safety of batteries. However, because lithium iron manganese phosphate (LMFP) material and ternary material are evenly distributed in an electrode made from a mixture of lithium iron manganese phosphate (LMFP) material and ternary material, different materials have different lengths of conductive paths, resulting in uneven electric currents during charging and discharging. In addition, a lot of contact interfaces may be formed between the two materials, and thereby increasing the impedance of batteries.

Therefore, a novel electrode capable of overcoming the above problems is needed to improve the performance of batteries.

SUMMARY

An embodiment of the disclosure provides a cathode of a lithium ion battery, including: a collector material; a first electrode layer, including a lithium manganese iron phosphate (LMFP) material, disposed on a surface of the collector material; and a second electrode layer, including an active material, disposed on the first electrode layer, wherein the active material includes lithium nickel manganese cobalt oxide (NMC), lithium nickel cobalt aluminum oxide (NCA), lithium cobalt oxide (LCO), Li-rich cathode material, or a combination thereof.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
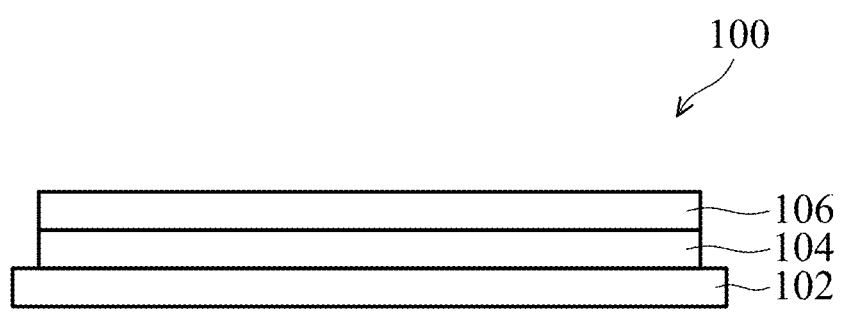
FIG. 1 is a cross-sectional view of a cathode of a lithium ion battery according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In addition, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The cathode of a lithium ion battery provided by the embodiments of the present disclosure has a multi-layer structure, rendering uniform conductive paths and reducing the contact interfaces between different materials. Also, batteries made from the cathode of a lithium ion battery provided by the present disclosure have improved rate charge-discharge performance.

Referring to FIG. 1, in some embodiments of the present disclosure, a cathode 100 of a lithium ion battery is provided. The cathode 100 of a lithium ion battery include a collector material 102, a first electrode layer 104 disposed on a surface of the collector material 102, and a second electrode layer 106 disposed on the first electrode layer 104.

In one embodiment, the collector material 102 may be an aluminum foil.

In one embodiment, the first electrode layer 104 may include a lithium manganese iron phosphate (LMFP) material. The lithium manganese iron phosphate (LMFP) material may have a chemical formula of $LiMn_xFe_{1-x}PO_4$, wherein $0.5 \leq x < 1$.

In some embodiments, the first electrode layer 104 may further include a binder and a conductive material. The first electrode layer 104 is a mixture made of a lithium manganese iron phosphate (LMFP) material, a binder, and a conductive material. The binder may include polyvinylidene fluoride (PVDF), polytetrafluoroethylene (PTFE), or a combination thereof. The conductive material may include conductive graphite, carbon black, carbon nanotubes, graphene, or a combination thereof.

In the first electrode layer 104, the weight percentage of the lithium manganese iron phosphate (LMFP) material may be, for example, 80-99 wt %, the weight percentage of the binder may be, for example, 0.5-20 wt %, and the weight percentage of the conductive material may be, for example, 0.5-20 wt %, based on the total weight of the first electrode layer 104. Because the lithium iron manganese phosphate (LMFP) material is the main source of electric capacity of the first electrode layer 104, when the weight percentage of the lithium manganese iron phosphate (LMFP) material is too low, the electric capacity of electrode and the energy density decrease. The higher the weight of the conductive material, the better the electrical properties of the resulting batteries. However, since the conductive material does not provide electric capacity, when the weight of the conductive material is greater than, for example, 20 wt %, the electric capacity of the electrode and the energy density decrease. Moreover, since the conductive material has a lower density and a larger surface area, when the weight of the conductive material is too high, it will have a great influence on the density and the processability of the electrode.

For example, in some embodiments, the weight percentage of the lithium manganese iron phosphate (LMFP) material may be, for example, 90-95 wt %, based on the total weight of the first electrode layer 104. In some embodiments, the weight percentage of the binder may be, for example, 2-10 wt %, based on the total weight of the first electrode layer 104. In some embodiments, the weight percentage of the conductive material may be, for example, 2-10 wt %, based on the total weight of the first electrode layer 104.

In one embodiment, the second electrode layer 106 may include an active material. In some embodiments, the active material may include, for example, lithium nickel manganese cobalt oxide (NMC), lithium nickel cobalt aluminum oxide (NCA), lithium cobalt oxide (LCO), Li-rich cathode material, or a combination thereof. In one embodiment, the lithium nickel manganese cobalt oxide (NMC) may have a chemical formula of $LiNi_xCo_yMn_zO_2$, wherein $0 < x < 1$, $0 < y < 1$, $0 < z < 1$, and $x+y+z=1$. In one embodiment, the lithium nickel cobalt aluminum oxide (NCA) may have a chemical formula of $LiNi_{0.80}Co_{0.15}Al_{0.05}O_2$. In one embodiment, the lithium cobalt oxide (LCO) may have a chemical formula of $LiCoO_2$. In one embodiment, the Li-rich cathode material may have a chemical formula of $xLi_2MnO_3 \cdot (1-x)LiMO_2$, wherein M is 3d transition metal and/or 4d transition metal, and $0 < x < 1$. In some embodiments, the 3d transition metal may be, for example, Sc, Ti, V, Cr, Mn, Fe, Co, Ni, Cu, or Zn, and the 4d transition metal may be, for example, Y, Zr, Nb, Mo, Tc, Ru, Rh, Pd, Ag, or Cd.

In some embodiments, the second electrode layer 106 may further include a binder and a conductive material. The second electrode layer 106 is a mixture made of the above active material, a binder, and a conductive material. The binder may include polyvinylidene fluoride (PVDF), polytetrafluoroethylene (PTFE), or a combination thereof. The conductive material may include conductive graphite, carbon black, carbon nanotubes, graphene, or a combination thereof.

In the second electrode layer 106, the weight percentage of the active material may be, for example, 80-99 wt %, the weight percentage of the binder may be, for example, 0.5-20 wt %, and the weight percentage of the conductive material may be, for example, 0.5-20 wt %, based on the total weight of the second electrode layer 106. Because the active material is the main source of electric capacity of the second electrode layer 106, when the weight percentage of the active material is too low, the electric capacity of electrode and the energy density decrease. The higher the weight of the conductive material, the better the electrical properties of the resulting batteries. However, since the conductive material does not provide electric capacity, when the weight of the conductive material is greater than, for example, 20 wt %, the electric capacity of the electrode and the energy density decrease. Moreover, since the conductive material has a lower density and a larger surface area, when the weight of the conductive material is too high, it will have a great influence on the density and the processability of the electrode.

For example, in some embodiments, the weight percentage of the active material may be, for example, 90-95 wt %, based on the total weight of the second electrode layer 106. In some embodiments, the weight percentage of the binder may be, for example, 2-10 wt %, based on the total weight of the second electrode layer 106. In some embodiments, the weight percentage of the conductive material may be, for example, 2-10 wt %, based on the total weight of the second electrode layer 106.

In some embodiments, the weight percentage of the second electrode layer 106 may be greater than 30 wt %, based on the total weight of the first electrode layer 104 and the second electrode layer 106. For example, in some embodiment, the weight percentage of the second electrode layer 106 may be greater than or equal to 50 wt %, 70 wt %, 80 wt %, based on the total weight of the first electrode layer 104 and the second electrode layer 106. Because the capacity of the active material of the second electrode layer 106 is higher than the capacity of the lithium manganese iron phosphate (LMFP) of the first electrode layer 104, when the weight percentage of the second electrode layer 106 is too low, for example, less than 30 wt %, the capacity of the resulting battery and energy density decrease.

In some embodiments, the slurry for forming the first electrode layer 104 and the second electrode layer 106 may be simultaneously coated on a surface of the collector material 102 in a layered manner by using, for example, a roll-to-roll slot-die coating method. After drying, it is pressed by a roll press machine to obtain a cathode 100 of a lithium ion battery as shown in FIG. 1.

In some embodiments, the compaction density of the first electrode layer 104 may be, for example, 1.5-3 g/cm$^3$, and the density of the second electrode layer 106 may be, for example, 2.5-4.2 g/cm$^3$.

Figure 2:
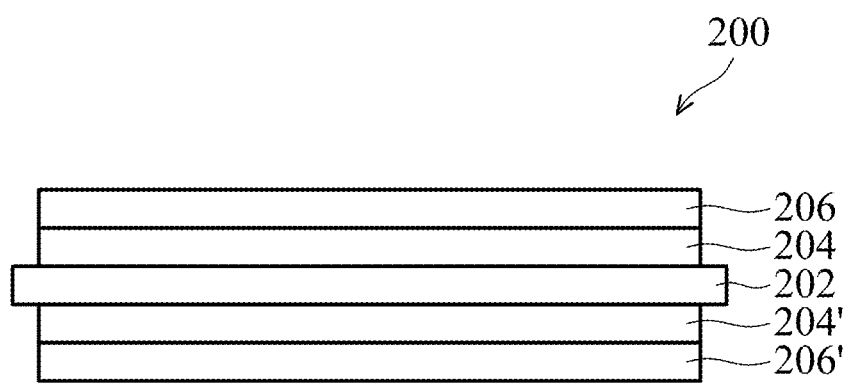
FIG. 2 is a cross-sectional view of a cathode of a lithium ion battery according to another exemplary embodiment of the present disclosure.

Referring to FIG. 2, other embodiments of the present disclosure provides a cathode 200 of a lithium ion battery. The cathode 200 of a lithium ion battery include a collector material 202, a first electrode layer 204 disposed on one surface of the collector material 202, and a second electrode layer 206 disposed on the first electrode layer 204. The difference between the cathode 200 of a lithium ion battery and the cathode 100 of a lithium ion battery is that the other surface of the collector material 202, with respect to the first electrode layer 204, of the cathode 200 of a lithium ion battery further includes a third electrode layer 204' and a fourth electrode layer 206' disposed on the third electrode layer 204'.

The first electrode layer 204 and the second electrode layer 206 are similar to the first electrode layer 104 and the second electrode layer 106, reference may be made to the foregoing description of the present specification, and are not described herein again.

In one embodiment, the third electrode layer 204' may include a lithium manganese iron phosphate (LMFP) material. The lithium manganese iron phosphate (LMFP) material may have a chemical formula of LiMn$_x$Fe$_{1-x}$PO$_4$, wherein 0.5≤x<1.

In some embodiments, the third electrode layer 204' further includes a binder and a conductive material. The third electrode layer 204' is a mixture made of a lithium manganese iron phosphate (LMFP) material, a binder, and a conductive material. The binder may include polyvinylidene fluoride (PVDF), polytetrafluoroethylene (PTFE), or a combination thereof. The conductive material may include conductive graphite, carbon black, carbon nanotubes, graphene, or a combination thereof.

In the third electrode layer 204', the weight percentage of the lithium manganese iron phosphate (LMFP) material may be, for example, 80-99 wt %, the weight percentage of the binder may be, for example, 0.5-20 wt %, and the weight percentage of the conductive material may be, for example, 0.5-20 wt %, based on the total weight of the third electrode layer 204'. Because the lithium iron manganese phosphate (LMFP) material is the main source of electric capacity of the third electrode layer 204', when the weight percentage of the lithium manganese iron phosphate (LMFP) material is too low, the electric capacity of electrode and the energy density decrease. The higher the weight of the conductive material, the better the electrical properties of the resulting batteries. However, since the conductive material does not provide electric capacity, when the weight of the conductive material is greater than, for example, 20 wt %, the electric capacity of the electrode and the energy density decrease. Moreover, since the conductive material has a lower density and a larger surface area, when the weight of the conductive material is too high, it will have a great influence on the density and the processability of the electrode.

For example, in some embodiments, the weight percentage of the lithium manganese iron phosphate (LMFP) material may be, for example, 90-95 wt %, based on the total weight of the third electrode layer 204'. In some embodiments, the weight percentage of the binder may be, for example, 2-10 wt %, based on the total weight of the third electrode layer 204'. In some embodiments, the weight percentage of the conductive material may be, for example, 2-10 wt %, based on the total weight of the third electrode layer 204'.

In one embodiment, the fourth electrode layer 206' may include an active material. In some embodiments, the active material may include, for example, lithium nickel manganese cobalt oxide (NMC), lithium nickel cobalt aluminum oxide (NCA), lithium cobalt oxide (LCO), Li-rich cathode material, or a combination thereof. In one embodiment, the lithium nickel manganese cobalt oxide (NMC) may have a chemical formula of LiNi$_x$Co$_y$Mn$_z$O$_2$, wherein 0<x<1, 0<y<1, 0<z<1, and x+y+z=1. In one embodiment, the lithium nickel cobalt aluminum oxide (NCA) may have a chemical formula of LiNi$_{0.80}$Co$_{0.15}$Al$_{0.05}$O$_2$. In one embodiment, the lithium cobalt oxide (LCO) may have a chemical formula of LiCoO$_2$. In one embodiment, the Li-rich cathode material may have a chemical formula of xLi$_2$MnO$_3$·(1−x)LiMO$_2$, wherein M is 3d transition metal and/or 4d transition metal, and 0<x<1. In some embodiments, the 3d transition metal may be, for example, Sc, Ti, V, Cr, Mn, Fe, Co, Ni, Cu, or Zn, and the 4d transition metal may be, for example, Y, Zr, Nb, Mo, Tc, Ru, Rh, Pd, Ag, or Cd.

In some embodiments, the fourth electrode layer 206' may further include a binder and a conductive material. The fourth electrode layer 206' is a mixture made of the above active material, a binder, and a conductive material. The binder may include polyvinylidene fluoride (PVDF), polytetrafluoroethylene (PTFE), or a combination thereof. The conductive material may include conductive graphite, carbon black, carbon nanotubes, graphene, or a combination thereof.

In the fourth electrode layer 206', the weight percentage of the active material may be, for example, 80-99 wt %, the weight percentage of the binder may be, for example, 0.5-20 wt %, and the weight percentage of the conductive material may be, for example, 0.5-20 wt %, based on the total weight of the fourth electrode layer 206'. Because the active material is the main source of electric capacity of the fourth electrode layer 206', when the weight percentage of the active material is too low, the electric capacity of electrode and the energy density decrease. The higher the weight of the conductive material, the better the electrical properties of the resulting batteries. However, since the conductive material does not provide electric capacity, when the weight of the conductive material is greater than, for example, 20 wt %, the electric capacity of the electrode and the energy density decrease. Moreover, since the conductive material has a lower density and a larger surface area, when the weight of the conductive material is too high, it will have a great influence on the density and the processability of the electrode.

For example, in some embodiments, the weight percentage of the active material may be, for example, 90-95 wt %, based on the total weight of the fourth electrode layer 206'. In some embodiments, the weight percentage of the binder may be, for example, 2-10 wt %, based on the total weight of the fourth electrode layer 206'. In some embodiments, the weight percentage of the conductive material may be, for example, 2-10 wt %, based on the total weight of the fourth electrode layer 206'.

In some embodiments, the weight percentage of the fourth electrode layer 206' may be greater than 30 wt %, based on the total weight of the third electrode layer 204' and the fourth electrode layer 206'. For example, in some embodiments, the weight percentage of the fourth electrode layer 206' may be greater than or equal to 50 wt %, 70 wt %, 80 wt %, based on the total weight of the third electrode layer 204' and the fourth electrode layer 206'. Because the capacity of the active material of the fourth electrode layer 206' is higher than the capacity of the lithium manganese iron phosphate (LMFP) of the third electrode layer 204', when the weight percentage of the fourth electrode layer 206' is too low, for example, less than 30 wt %, the capacity of the resulting battery and energy density decrease.

In some embodiments, the slurry for forming the first electrode layer 204 and the second electrode layer 206 may be simultaneously coated on one surface of the collector material 202 in a layered manner by using, for example, a roll-to-roll slot-die coating method. Then, the slurry for forming the third electrode layer 204' and the fourth electrode layer 206' may be simultaneously coated on another surface of the collector material 202 in a layered manner by using, for example, a roll-to-roll slot-die coating method. After drying, it is pressed by a roll press machine to obtain a cathode 200 of a lithium ion battery as shown in FIG. 2.

In some embodiments, the compaction density of the first electrode layer 204 may be, for example, 1.5-3 g/cm$^3$, the density of the second electrode layer 206 may be, for example, 2.5-4.2 g/cm$^3$, the compaction density of the third electrode layer 204' may be, for example, 1.5-3 g/cm$^3$, and the density of the fourth electrode layer 206' may be, for example, 2.5-4.2 g/cm$^3$.

The Examples and Comparative Examples are described below to illustrate the cathode of a lithium ion battery provided by the present disclosure, batteries formed therefrom, and the properties thereof.

EXAMPLE 1

NMC/LMFP Bilayer Cathode

Firstly, the lithium nickel manganese cobalt oxide (NMC) slurry and the lithium manganese iron phosphate (LMFP) slurry were prepared respectively.

Lithium nickel manganese cobalt oxide (NMC) slurry was prepared by first adding polyvinylidene fluoride (PVDF) used as a binder to N-methylpyrrolidone (NMP) used as a solvent. The mixture was stirred at high speed and uniformly dispersed. Then, carbon black used as a conductive material was added and dispersed by stirring. Finally, lithium nickel manganese cobalt oxide (NMC) was added and stirred at high speed and uniformly dispersed to obtain the lithium nickel manganese cobalt oxide (NMC) slurry. The weight ratio of lithium nickel manganese cobalt oxide (NMC): conductive material:binder was 92:5:3.

Lithium manganese iron phosphate (LMFP) slurry was prepared by first adding polyvinylidene fluoride (PVDF) used as a binder to N-methylpyrrolidone (NMP) used as a solvent. The mixture was stirred at high speed and uniformly dispersed. Then, carbon black used as a conductive material was added and dispersed by stirring. Finally, lithium manganese iron phosphate (LMFP) was added and stirred at high speed and uniformly dispersed to obtain the lithium manganese iron phosphate (LMFP) slurry. The weight ratio of lithium manganese iron phosphate (LMFP):conductive material:binder was 90:4:6.

Next, the prepared NMC slurry and the prepared LMFP slurry were simultaneously coated on one surface of the aluminum foil in a layered manner by using a slot die, wherein the weight ratio of the active material lithium nickel manganese cobalt oxide (NMC) in the NMC slurry and the active material lithium manganese iron phosphate (LMFP) in the LMFP slurry was 8:2. The NMC slurry was coated on the upper layer, and the LMFP slurry was coated on the lower layer. In other words, the LMFP slurry was coated on one surface of the aluminum foil, and the NMC slurry was coated on the LMFP slurry. The aforementioned steps were repeated on the other surface of the aluminum foil with respect to the formed NMC/LMFP layers to form the same NMC/LMFP electrode. After drying, a cathode of a lithium ion battery as shown in FIG. 2 was obtained. Finally, the electrode was pressed by a roll press machine to increase the density of the electrode and the preparation of the NMC/LMFP bilayer cathode was completed.

COMPARATIVE EXAMPLE 1

LMFP/NMC Bilayer Cathode

The same process as described in Example 1 was repeated to prepare the LMFP/NMC bilayer cathode, except that the NMC slurry was coated on the lower layer and the LMFP slurry was coated on the upper layer.

COMPARATIVE EXAMPLE 2

LMFP+NMC Mixed Cathode

The same process as described in Example 1 was repeated to prepare the LMFP+NMC mixed cathode, except that the NMC slurry and the LMFP slurry were mixed and coated on the aluminum foil.

Rate Charge-Discharge Performance of Batteries I: Graphite Anode

Figure 3A:
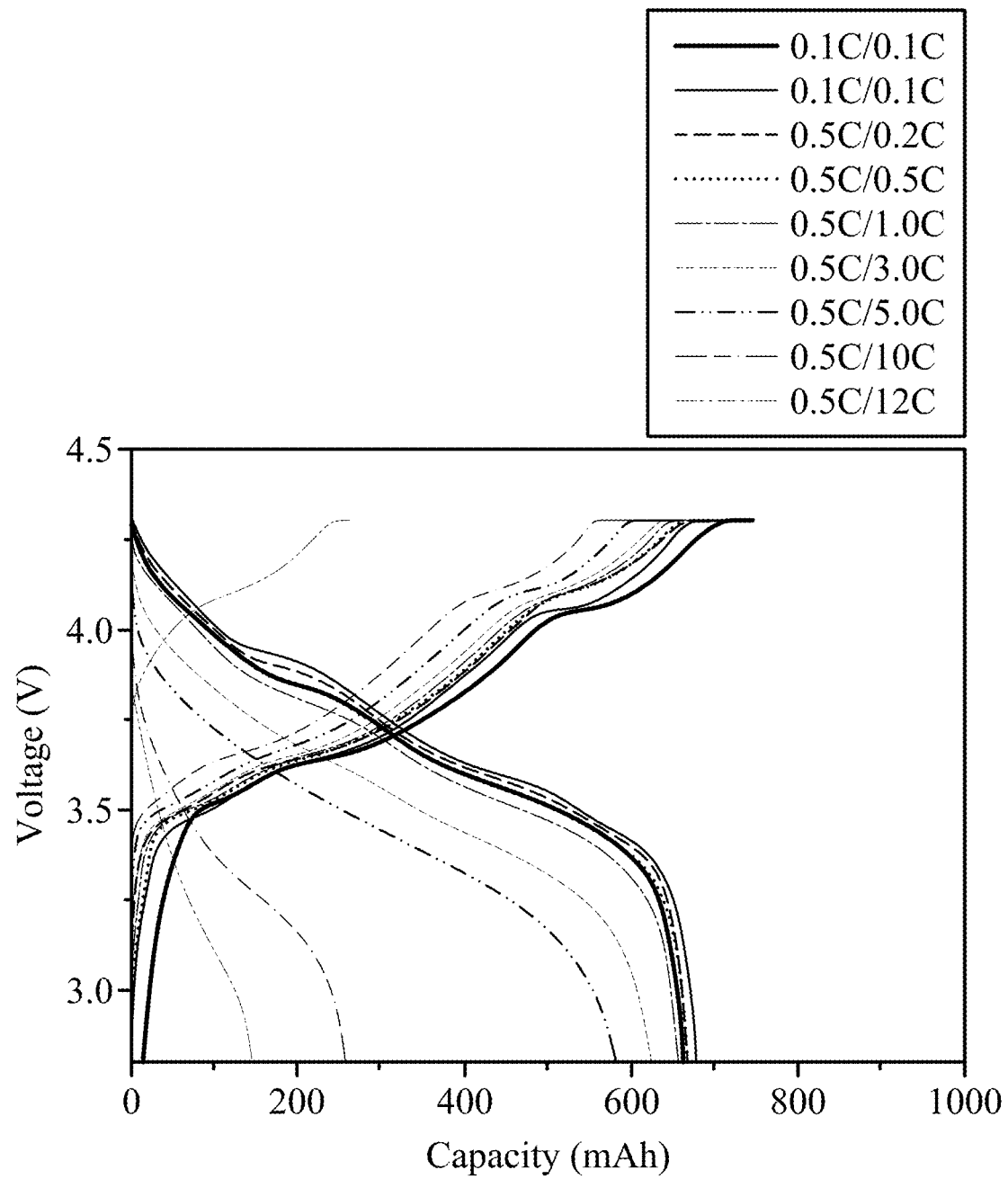
FIG. 3A illustrates the rate charge-discharge performance of the lithium ion battery according to an exemplary embodiment of the present disclosure.
Figure 3B:
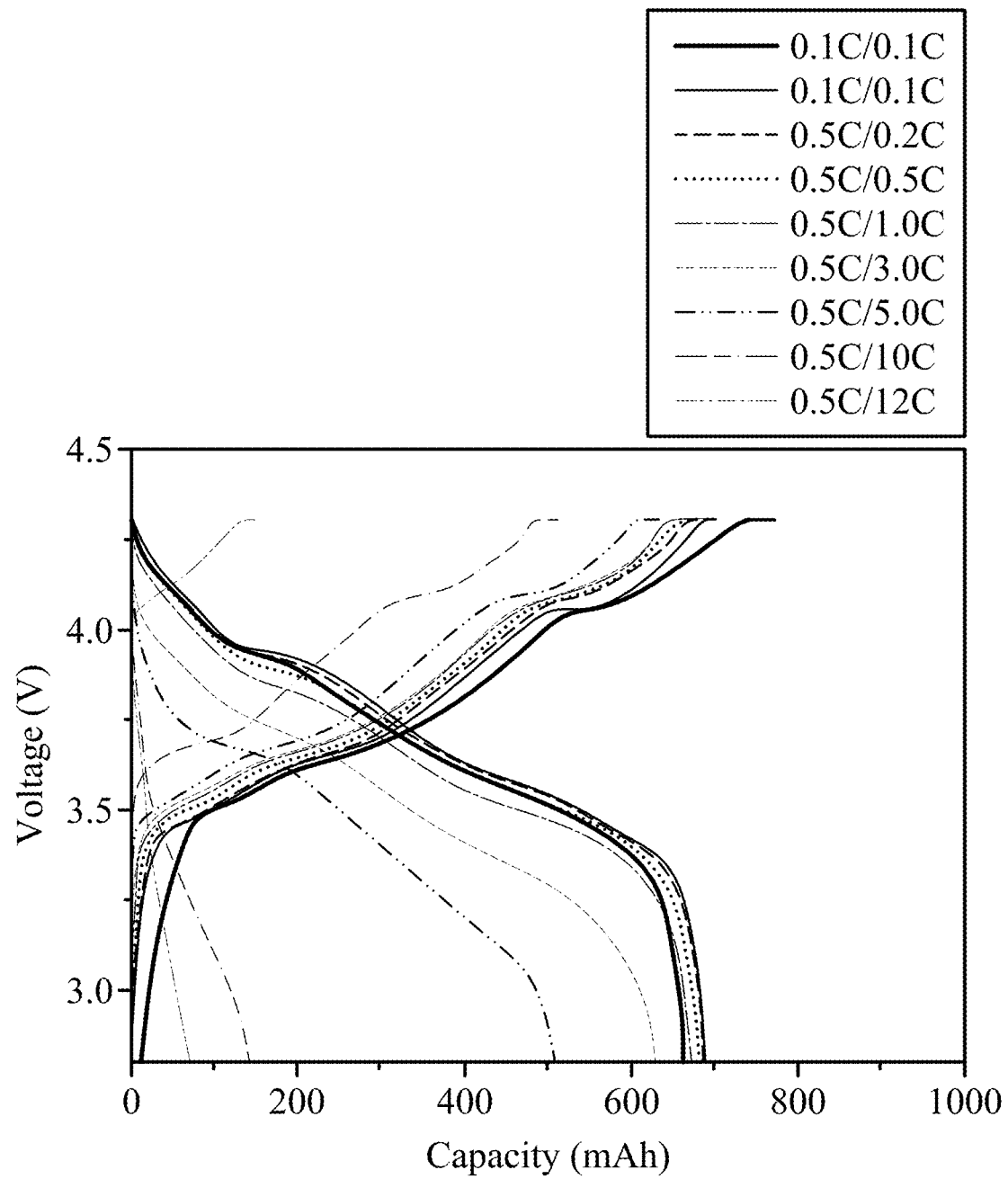
FIG. 3B illustrates the rate charge-discharge performance of the lithium ion battery according to a comparative example of the present disclosure.
Figure 3C:
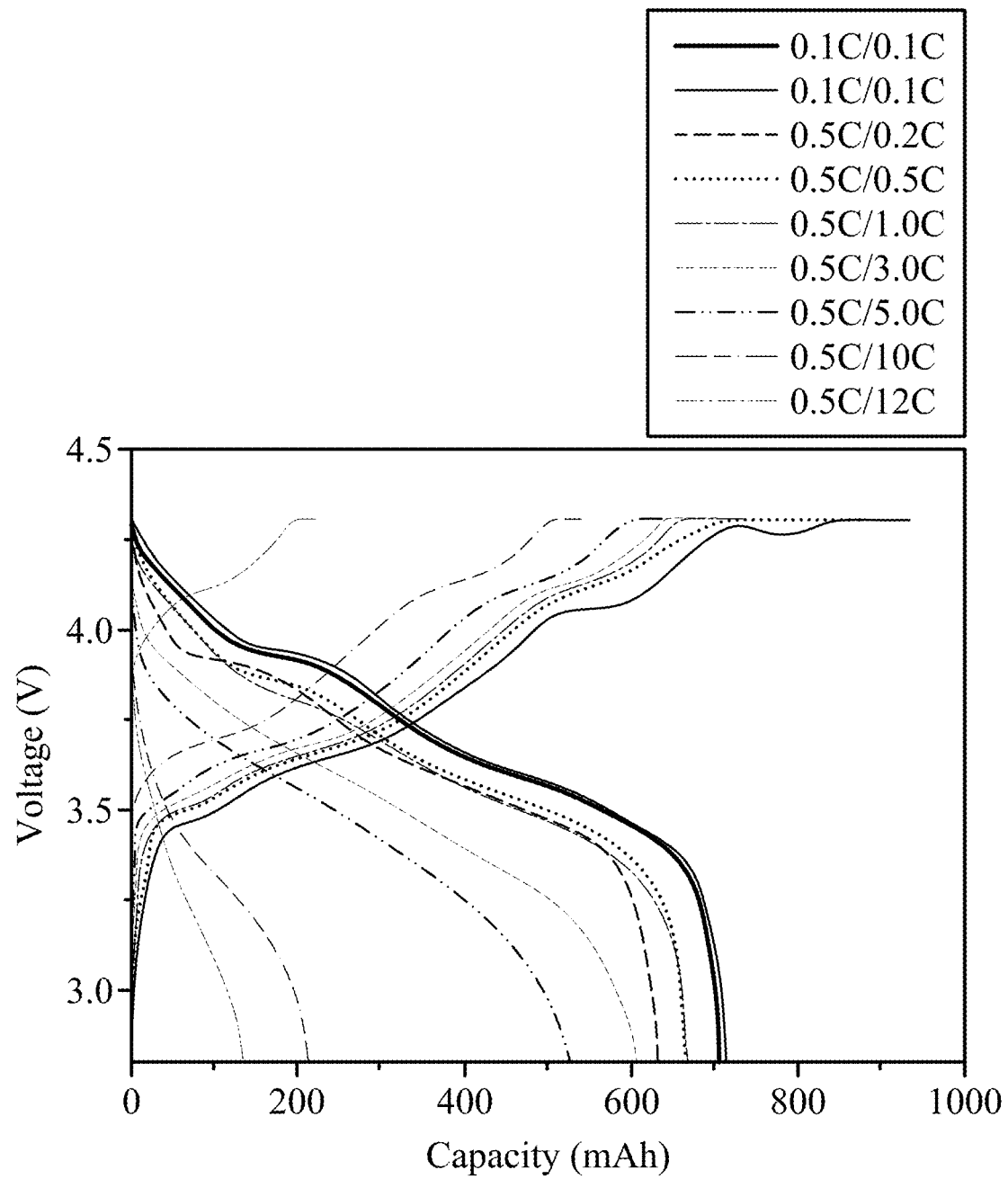
FIG. 3C illustrates the rate charge-discharge performance of the lithium ion battery according to another comparative example of the present disclosure.

The resulting cathodes prepared in Example 1 and Comparative Examples 1 and 2 were cut into a size of 5.7 cm in length and 3.2 cm in width. A graphite of 5.9 cm in length and 3.4 cm in width was used as the anode. The cathode and anode were stacked to form cells. After adding an adequate amount of electrolyte, a soft pack battery was formed in a size of 3.5×6.0 cm by using vacuum packaging. Charging and discharging tests were conducted with different rates, and the rate charge-discharge performance of batteries formed from the NMC/LMFP bilayer cathode prepared in Example 1, the LMFP/NMC bilayer cathode prepared in Comparative Example 1, and the LMFP+NMC mixed cathode prepared in Comparative Example 2 were compared. FIGS. 3A-3C sequentially reveals the rate charge-discharge performance of batteries formed from the cathode prepared in Example 1, the cathode prepared in Comparative Example 1, and the cathode prepared in Comparative Example 2. The results of FIGS. 3A-3C are also shown in Table 1.

TABLE 1

| | Cathode | | | | | |
|---|---|---|---|---|---|---|
| | Example 1 NMC/LMFP bilayer | | Comparative Example 1 LMFP/NMC bilayer | | Comparative Example 2 LMFP + NMC mixed | |
| | Anode | | | | | |
| | graphite | | graphite | | graphite | |
| C-rate | capacity retention (%) | working voltage (v) | capacity retention (%) | working voltage (v) | capacity retention (%) | working voltage (v) |
| 0.1 C | 100.0 | — | 100.0 | — | 100.0 | — |
| 0.2 C | 98.2 | 3.70 | 99.4 | 3.71 | 88.2 | 3.66 |
| 0.5 C | 98.4 | 3.69 | 98.8 | 3.69 | 93.1 | 3.67 |
| 1 C | 96.5 | 3.66 | 97.4 | 3.65 | 93.4 | 3.64 |

TABLE 1-continued

| | Cathode | | | | | |
| --- | --- | --- | --- | --- | --- | --- |
| | Example 1 NMC/LMFP bilayer | | Comparative Example 1 LMFP/NMC bilayer | | Comparative Example 2 LMFP + NMC mixed | |
| Anode | | | | | | |
| | graphite | | graphite | | graphite | |
| C-rate | capacity retention (%) | working voltage (v) | capacity retention (%) | working voltage (v) | capacity retention (%) | working voltage (v) |
| 3 C | 91.9 | 3.54 | 91.3 | 3.53 | 84.7 | 3.51 |
| 5 C | 85.5 | 3.46 | 73.6 | 3.46 | 73.4 | 3.44 |
| 10 C | 37.8 | 3.34 | 20.5 | 3.28 | 29.6 | 3.31 |
| 12 C | 21.4 | 3.28 | 10.0 | 3.27 | 18.9 | 3.26 |

Higher capacity retention and higher working voltage are preferable. It can be seen from FIGS. 3A-3C and Table 1 that, when C-rate was 3 C, 5 C, 10 C, or 12 C, the capacity retention and working voltage of the battery using NMC/LMFP bilayer cathode were significantly better than the capacity retention and working voltage of the batteries using LMFP/NMC bilayer cathode and LMFP+NMC mixed cathode.

Rate Charge-Discharge Performance of Batteries II: Lithium Titanate (LTO) Anode

Figure 4A:
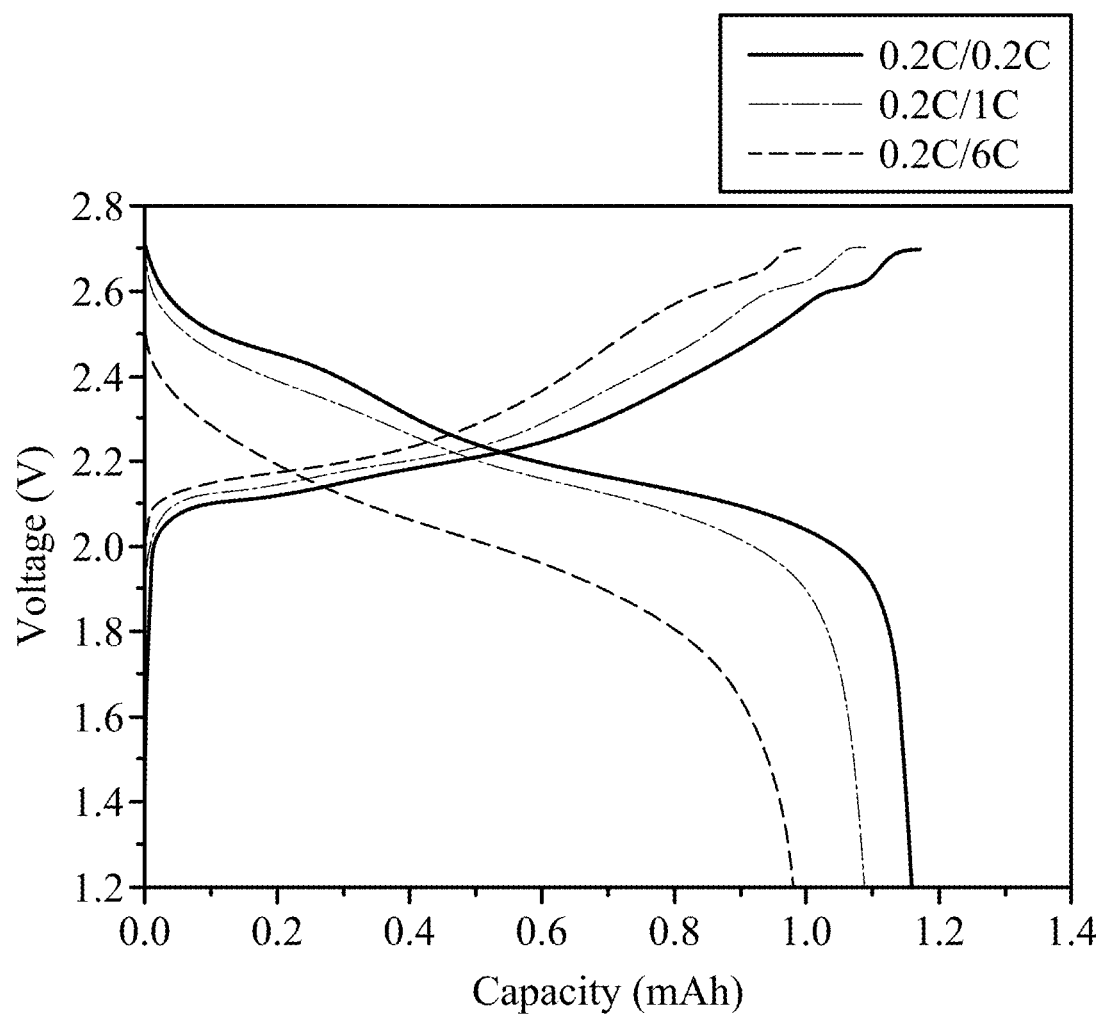
FIG. 4A illustrates the rate charge-discharge performance of the lithium ion battery according to another exemplary embodiment of the present disclosure.
Figure 4B:
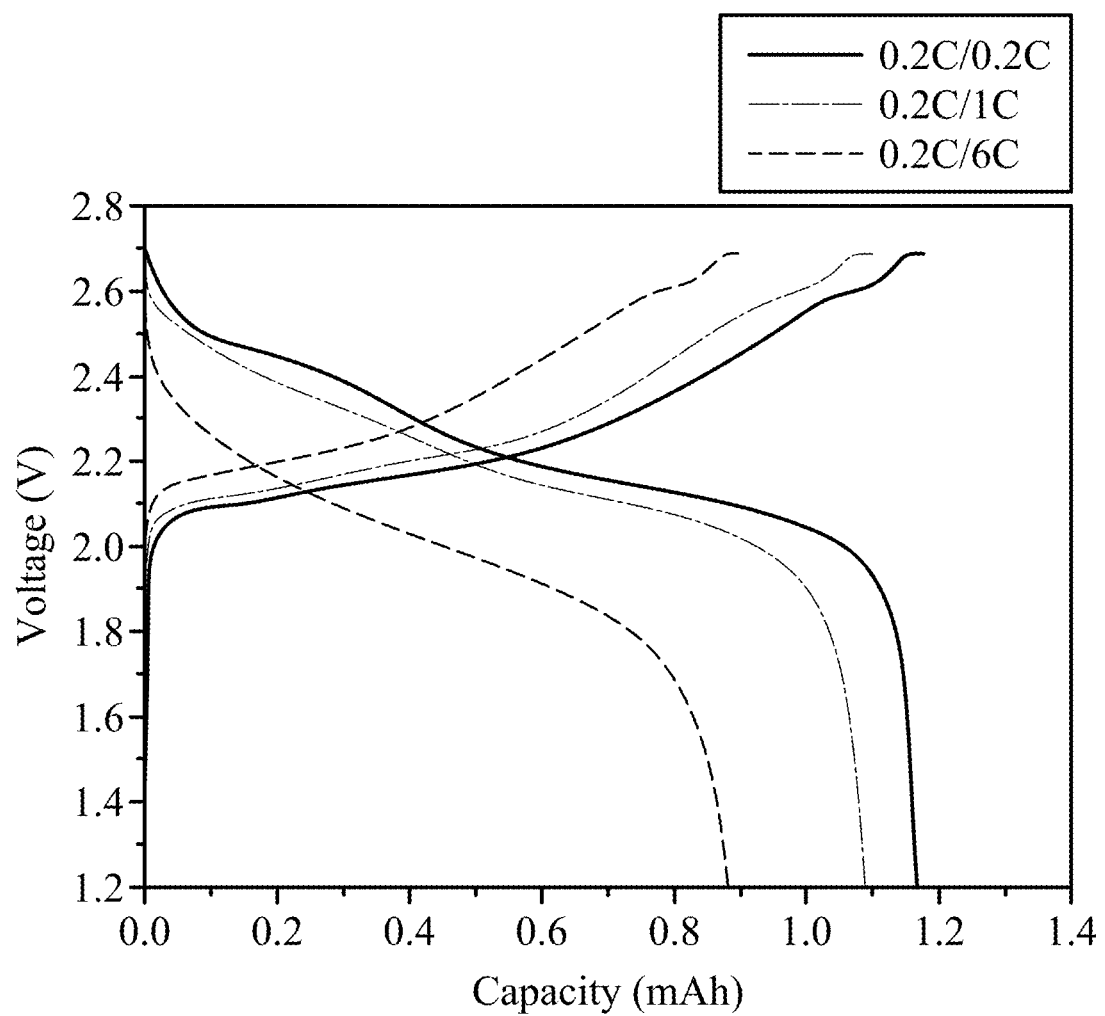
FIG. 4B illustrates the rate charge-discharge performance of the lithium ion battery according to another comparative example of the present disclosure.

The resulting cathodes prepared in Example 1 and Comparative Example 2 were both cut into a size of 5.7 cm in length and 3.2 cm in width. A lithium titanate (LTO) of 5.9 cm in length and 3.4 cm in width was used as the anode. The cathode and anode were stacked to form cells. After adding an appropriate amount of electrolyte, a soft pack battery was formed in a size of 3.5×6.0 cm by using vacuum packaging. Charging and discharging tests were conducted with different rates, and the rate charge-discharge performance of batteries formed from the NMC/LMFP bilayer cathode prepared in Example 1 and the LMFP+NMC mixed cathode prepared in Comparative Example 2 were compared. FIG. 4A and FIG. 4B respectively reveals the rate charge-discharge performance of batteries formed from the cathode prepared in Example 1 and the cathode prepared in Comparative Example 2. The results of FIG. 4A and FIG. 4B are shown in Table 2.

TABLE 2

| | Cathode | | | |
| --- | --- | --- | --- | --- |
| | Example 1 NMC/LMFP bilayer | | Comparative Example 2 LMFP + NMC mixed | |
| Anode | | | | |
| | lithium titanate (LTO) | | lithium titanate (LTO) | |
| C-rate | capacity retention (%) | working voltage (v) | capacity retention (%) | working voltage (v) |
| 0.2 C | 100 | 2.22 | 100 | 2.23 |
| 1 C | 93.8 | 2.18 | 93.3 | 2.18 |
| 6 C | 84.5 | 1.99 | 75.3 | 1.99 |

Similarly, higher capacity retention and higher working voltage are preferable. It can be seen from FIG. 4A, FIG. 4B, and Table 2 that, at 6 C, the capacity retention of the battery using NMC/LMFP bilayer cathode was 84.5%, which was better than the capacity retention 75.3% of the battery using LMFP+NMC mixed cathode.

It can be realized from the results shown in Table 1 and Table 2 that compared to the batteries formed from the cathode of the Comparative Examples, by using the cathode of a lithium ion battery provided by the present disclosure and different anode materials, the resulting batteries have improved rate charge-discharge performance.

Safety Test

The above lithium ion batteries were tested for safety using a penetration experiment, which simulates a situation in which the batteries are short-circuited when subjected to external force or penetration. When the batteries were fully charged (100% SOC), the penetration experiment was performed using a metal needle having a diameter of 3 mm. The penetration speed was 1 mm/s, the penetration depth was 10 mm, and complete penetration (the needle penetrated through the batteries) was carried out. During the penetration process, the voltage and temperature changes of batteries were detected, and the batteries were observed for swelling, fire, smoke and so on. The test results are shown in FIGS. 5A-5B and 6A-6B.

Figure 5A:
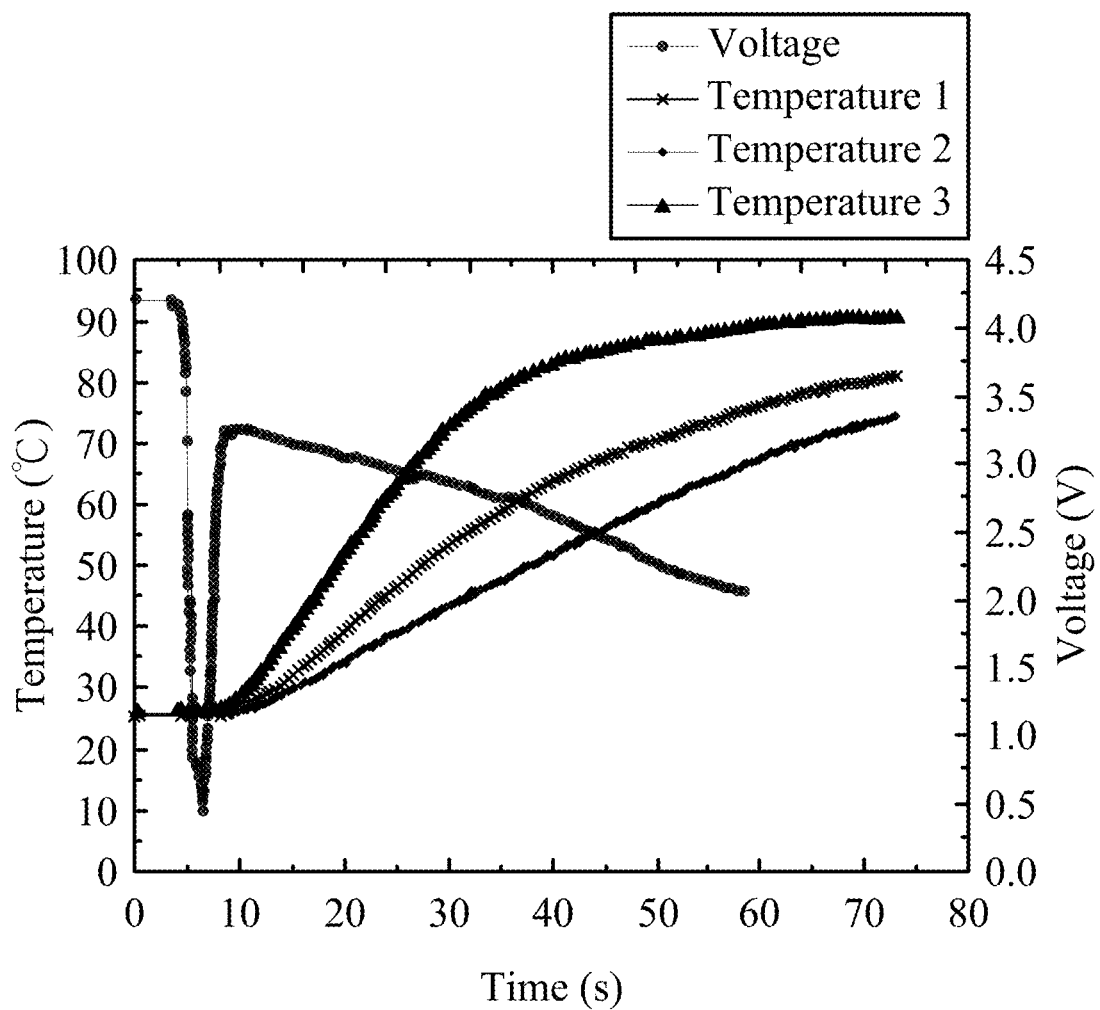
FIG. 5A illustrates a graph showing voltage and temperature changes of the lithium ion battery according to another exemplary embodiment of the present disclosure.
Figure 5B:
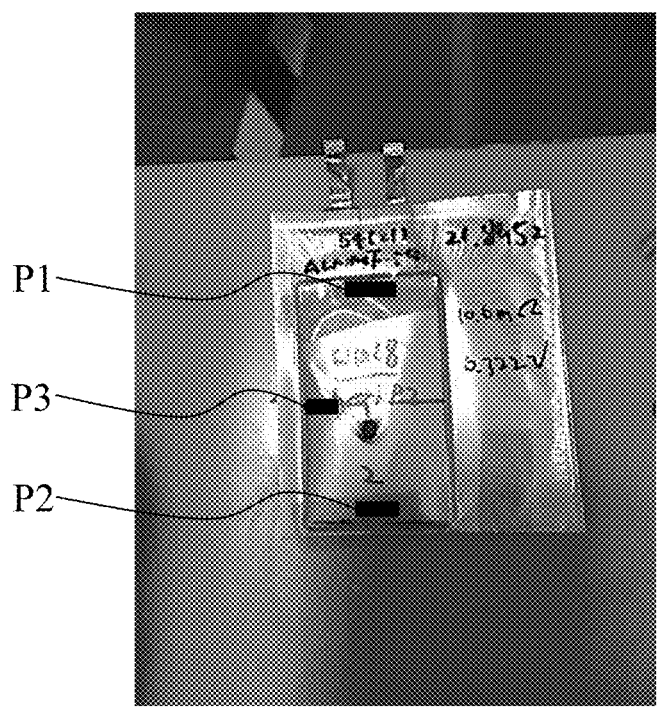
FIG. 5B is a diagram showing the appearance of the lithium ion battery after a penetration experiment according to another exemplary embodiment of the present disclosure.

FIG. 5A illustrates a graph showing voltage and temperature changes of the lithium ion battery having the NMC/LMFP bilayer cathode of Example 1 and the graphite anode. FIG. 5B is a diagram showing the appearance of such a lithium ion battery after the penetration experiment. It can be seen from FIGS. 5A and 5B that the maximum temperature of the battery fabricated by the cathode of Example 1 after being penetrated was about 90° C. The battery did not produce smoke or fire during the experiment, and the battery did not obviously swell after the experiment. The temperatures 1 to 3 shown in FIG. 5A represent the temperatures of the three test positions P1, P2, and P3 of the battery cell as shown in FIG. 5B, respectively.

Figure 6A:
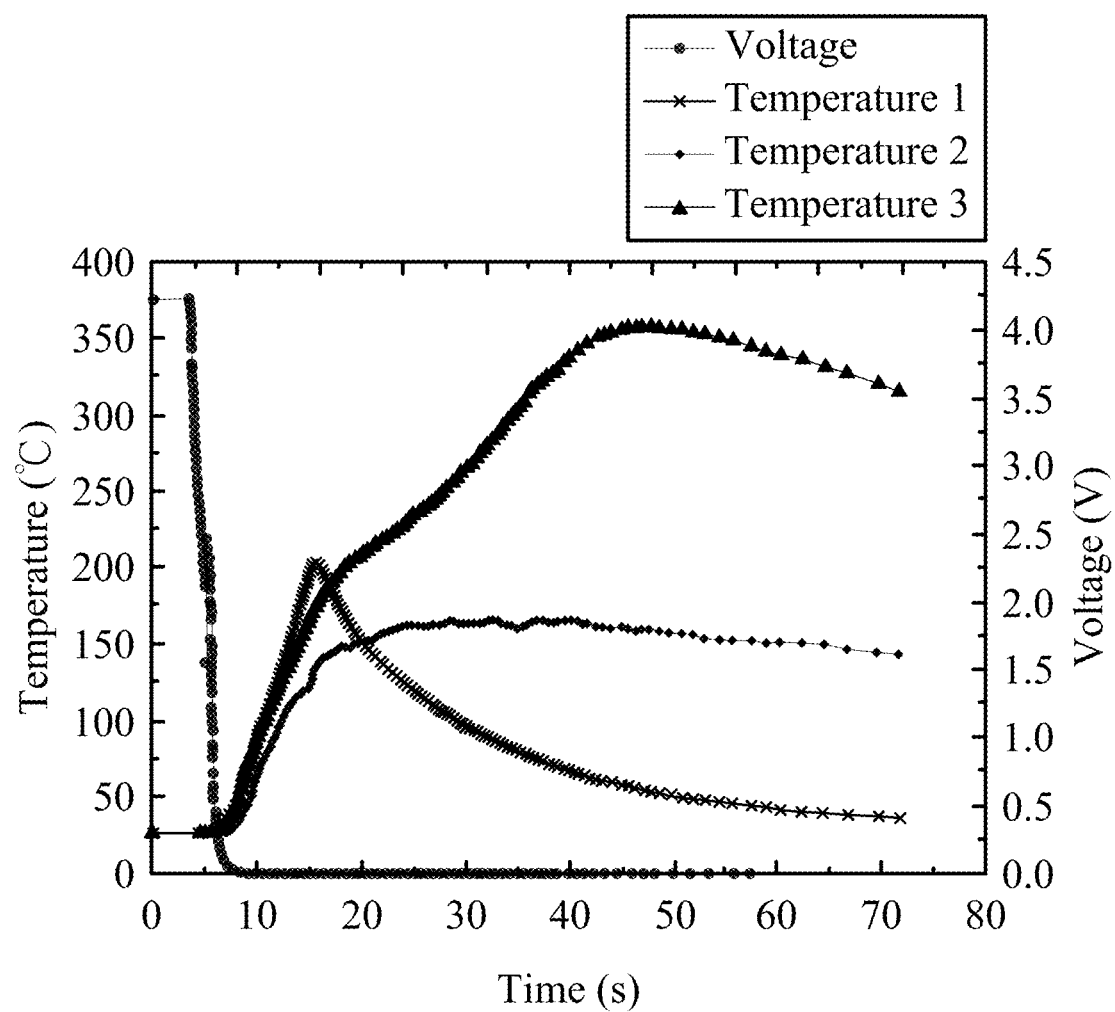
FIG. 6A illustrates a graph showing voltage and temperature changes of the lithium ion battery according to another comparative embodiment of the present disclosure.
Figure 6B:
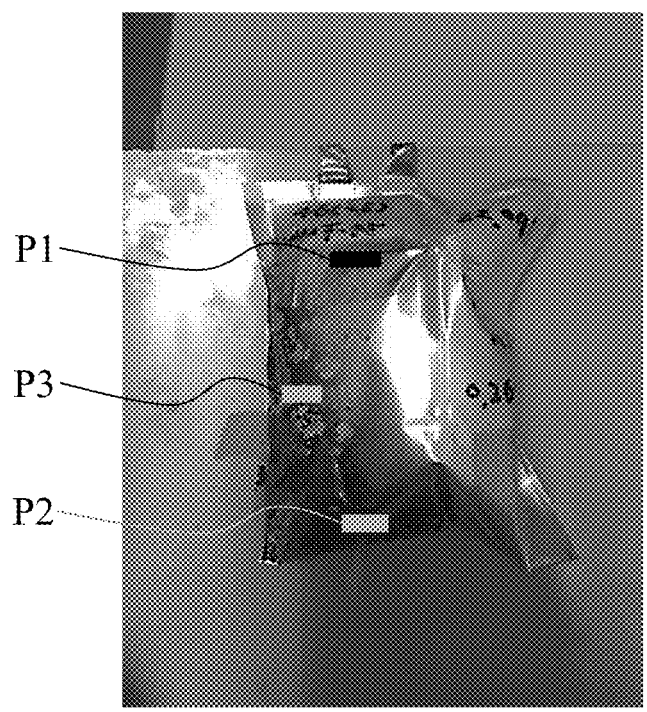
FIG. 6B is a diagram showing the appearance of the lithium ion battery after a penetration experiment according to another comparative embodiment of the present disclosure.

FIG. 6A illustrates a graph showing voltage and temperature changes of the lithium ion battery having the LMFP+NMC mixed cathode of Comparative Example 2 and the graphite anode. FIG. 6B is a diagram showing the appearance of such a lithium ion battery after the penetration experiment. It can be seen from FIGS. 6A and 6B that the maximum temperature of the battery fabricated by the cathode of Comparative Example 2 after being penetrated increased to about 350° C. The battery produced a lot of smoke and rapidly swelled during the experiment, and thermal runaway occurred. The battery obviously swelled after the experiment. The temperatures 1 to 3 shown in FIG. 6A represent the temperatures of the three test positions P1, P2, and P3 of the battery cell as shown in FIG. 6B, respectively.

It can be known from the results of FIGS. 5A-5B and 6A-6B that the battery fabricated by the cathode provided by the present disclosure has better safety performance, as compared with the battery fabricated by the cathode of Comparative Example.

The cathode of a lithium ion battery provided by the present disclosure has a multi-layered structure. By sequentially disposing a lithium manganese iron phosphate (LMFP) material and an active material such as ternary material like lithium nickel manganese cobalt oxide (NMC) on the collector material, the resulting lithium ion battery has improved rate charge-discharge performance.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A cathode of a lithium ion battery, comprising:
    a collector material;
    a first electrode layer, comprising $LiMn_xFe_{1-x}PO_4$, disposed on one surface of the collector material; and
    a second electrode layer, comprising an active material, disposed directly on the first electrode layer, wherein the active material comprises $LiNi_xCo_yMn_zO_2$, $LiNi_{0.80}Co_{0.15}Al_{0.05}O_2$, $LiCoO_2$, $xLi_2MnO_3 \cdot (1-x)LiMO_2$, or a combination thereof,
    wherein,
    in $LiMn_xFe_{1-x}PO_4$, $0.5 \leq x < 1$;
    in $LiNi_xCo_yMn_zO_2$, $0<x<1$, $0<y<1$, $0<z<1$, and $x+y+z=1$; and
    in $xLi_2MnO_3 \cdot (1-x)LiMO_2$, M is a 3d transition metal and/or a 4d transition metal, and $0<x<1$,
    wherein the weight percentage of the second electrode layer is greater than 30 wt % and not more than 80 wt %, based on the total weight of the first electrode layer and the second electrode layer.

2. The cathode of a lithium ion battery as claimed in claim 1, further comprising:
    a third electrode layer, comprising $LiMn_xFe_{1-x}PO_4$, disposed on another surface of the collector material; and
    a fourth electrode layer, comprising an active material, disposed on the third electrode layer, wherein the active material comprises $LiNi_xCo_yMn_zO_2$, $LiNi_{0.80}Co_{0.15}Al_{0.05}O_2$, $LiCoO_2$, $xLi_2MnO_3 \cdot (1-x)LiMO_2$, or a combination thereof,
    wherein,
    in $LiMn_xFe_{1-x}PO_4$, $0.5 \leq x < 1$;
    in $LiNi_xCo_yMn_zO_2$, $0<x<1$, $0<y<1$, $0<z<1$, and $x+y+z=1$; and
    in $xLi_2MnO_3 \cdot (1-x)LiMO_2$, M is a 3d transition metal and/or a 4d transition metal, and $0<x<1$.

3. The cathode of a lithium ion battery as claimed in claim 2, wherein the weight percentage of the fourth electrode layer is greater than 30 wt % and not more than 80 wt %, based on the total weight of the third electrode layer and the fourth electrode layer.

4. The cathode of a lithium ion battery as claimed in claim 2, wherein the third electrode layer further comprises a binder and a conductive material, wherein the weight percentage of $LiMn_xFe_{1-x}PO_4$ is 80-99 wt %, the weight percentage of the binder is 0.5-20 wt %, and the weight percentage of the conductive material is 0.5-20 wt %, based on the total weight of the third electrode layer, wherein the compaction density of the third electrode layer is 1.5-3 $g/cm^3$.

5. The cathode of a lithium ion battery as claimed in claim 4, wherein the binder comprises polyvinylidene fluoride (PVDF), polytetrafluoroethylene (PTFE), or a combination thereof.

6. The cathode of a lithium ion battery as claimed in claim 4, wherein the conductive material comprises conductive graphite, carbon black, carbon nanotubes, graphene, or a combination thereof.

7. The cathode of a lithium ion battery as claimed in claim 2, wherein the fourth electrode layer further comprises a binder and a conductive material, wherein the weight percentage of the active material is 80-99 wt %, the weight percentage of the binder is 0.5-20 wt %, and the weight percentage of the conductive material is 0.5-20 wt %, based on the total weight of the fourth electrode layer, wherein the compaction density of the fourth electrode layer is 2.5-4.2 $g/cm^3$.

8. The cathode of a lithium ion battery as claimed in claim 7, wherein the binder comprises polyvinylidene fluoride (PVDF), polytetrafluoroethylene (PTFE), or a combination thereof.

9. The cathode of a lithium ion battery as claimed in claim 7, wherein the conductive material comprises conductive graphite, carbon black, carbon nanotubes, graphene, or a combination thereof.

10. The cathode of a lithium ion battery as claimed in claim 1, wherein the first electrode layer further comprises a binder and a conductive material, wherein the weight percentage of $LiMn_xFe_{1-x}PO_4$ is 80-99 wt %, the weight percentage of the binder is 0.5-20 wt %, and the weight percentage of the conductive material is 0.5-20 wt %, based on the total weight of the first electrode layer, wherein the compaction density of the first electrode layer is 1.5-3 $g/cm^3$.

11. The cathode of a lithium ion battery as claimed in claim 10, wherein the binder comprises polyvinylidene fluoride (PVDF), polytetrafluoroethylene (PTFE), or a combination thereof.

12. The cathode of a lithium ion battery as claimed in claim 10, wherein the conductive material comprises conductive graphite, carbon black, carbon nanotubes, graphene, or a combination thereof.

13. The cathode of a lithium ion battery as claimed in claim 1, wherein the second electrode layer further comprises a binder and a conductive material, wherein the weight percentage of the active material is 80-99 wt %, the weight percentage of the binder is 0.5-20 wt %, and the weight percentage of the conductive material is 0.5-20 wt %, based on the total weight of the second electrode layer, wherein the compaction density of the second electrode layer is 2.5-4.2 $g/cm^3$.

14. The cathode of a lithium ion battery as claimed in claim 13, wherein the binder comprises polyvinylidene fluoride (PVDF), polytetrafluoroethylene (PTFE), or a combination thereof.

15. The cathode of a lithium ion battery as claimed in claim 13, wherein the conductive material comprises conductive graphite, carbon black, carbon nanotubes, graphene, or a combination thereof.

* * * * *